United States Patent [19]

Logan

[11] Patent Number: 5,272,857
[45] Date of Patent: Dec. 28, 1993

[54] SURGICAL SLIPPERS FOR ANIMAL

[75] Inventor: Ernest F. Logan, Ballyclare, United Kingdom

[73] Assignee: Giltspur Scientific Limited, United Kingdom

[21] Appl. No.: 952,058

[22] Filed: Sep. 28, 1992

[51] Int. Cl.$^5$ .............................. A01L 3/00; A01L 5/00
[52] U.S. Cl. .................................... 54/82; 168/18
[58] Field of Search .................. 54/82; 168/1, 2, 18, 168/27; 36/111

[56] References Cited

U.S. PATENT DOCUMENTS

| | | | |
|---|---|---|---|
| 2,651,853 | 9/1953 | Lewis | 54/82 |
| 3,236,310 | 2/1966 | Quick | 168/18 |
| 4,444,269 | 4/1984 | Laurent | 36/111 X |
| 4,503,914 | 3/1985 | Voland | 168/18 |

FOREIGN PATENT DOCUMENTS

| | | | |
|---|---|---|---|
| 2560745 | 9/1985 | France | 54/82 |
| 2012542 | 8/1979 | United Kingdom | 168/18 |
| 2223152 | 4/1990 | United Kingdom . | |

Primary Examiner—Robert P. Swiatek
Attorney, Agent, or Firm—Andrus, Sceales, Starke & Sawall

[57] ABSTRACT

A surgical slipper for cleft footed animals in either left or right claw configuration comprising a sole (3) and upper (1,2) which together define a cavity into which one claw of the cleft footed animal is, in use, fitted, and a lattice (4) in the form of an array of intersecting ribs projects from the underside of the sole. The ribs are thick enough to hold the claw away from the ground and the sole is arranged to be thin enough in voids between the ribs so that a hole can be readily punched for drainage purposes.

8 Claims, 1 Drawing Sheet

SURGICAL SLIPPERS FOR ANIMAL

This invention relates to a surgical slipper which is intended to be fitted to one of the claws of the foot of a cow or other cleft footed animal. One particular application is the use in veterinary practice, or in the hands of the skilled herdsman, to treat the prevalent disease in the dairy herd known as "lame cow".

Lameness in the dairy animal results in pain and distress and this stress quickly manifests itself in appreciable reductions in milk yield; in fact in the United Kingdom alone this has been estimated at some £50 millions per annum.

Such a slipper device has already been disclosed in GB-A-2,223,152 which teaches the use of the device in dairy cows where the affliction is often confined to the lateral claw of the hind foot. Although this described device was a great improvement on the prior art it suffered from a disadvantage concerning the sole of the slipper which raised the diseased claw above the ground whilst remaining in ground contact itself. Being a smooth plastic surface it left the hind foot with only half its normal area of contact with the ground and in wet/manure conditions the leg was prone to much slipping with the result that the animal was resubjected to stress.

According to the present invention a surgical slipper for cleft footed animals in either a left or right claw configuration, the slipper comprising a sole and upper which together define a cavity into which one claw of the cleft footed animal is, in use, fitted, with a lattice in the form of an array of intersecting ribs projecting from the underside of the sole; wherein the ribs are thick enough to hold the claw, in use, away from the ground and the sole is arranged to be thin enough in voids between the ribs so that a hole can be readily punched for drainage purposes.

The voids in the bottom of the sole of such a lattice soled slipper would in practice soon fill with farm debris and produce a surface area of contact which was anti-slip compared to the flat polymer sole of GB-A-2,223,152.

Another problem concerns the surgical procedure of preparing the claw to receive the surgical slipper. When pared, trimmed and rasped the foot on many occasions would be seriously enough affected to contain a sinus or narrow opening through which pus or other drainage would be discharged. Under these circumstances it was contraindicated to seal the claw in a resin within the slipper otherwise serious septic conditions could ensue.

As the lattice holds the sole of the slipper off the ground, a person fitting the slipper can readily punch a hole in sole between the ribs of the lattice in the appropriate position so that a sinus can still continue to drain to the outside.

The slipper can be conveniently made in a single piece as an injection moulding of plastic. The plastic preferably has its plasticiser top-up requirement satisfied with an aliquot of veterinary anti-foot rot compounds. It may be desirable to use a recycled plastic, in which case the oils for re-plasticising the plastic are preferably selected from a group containing natural antiseptic essential oils, wood tar and wood creosote oil.

The upper may comprise a substantially planar side wall, and a top, front and other side wall which are a continuation of the planar side wall and are externally convexly curved in both the horizontal and vertical directions, i.e. around the front and over the top of the slipper. The ribs preferably intersect at right angles.

The time necessary to immobilise the foot whilst the mineral filled resin set within the slipper between the horny surface and plastic interior is another problem associated with the prior art. When the environment was warm the time could be as low as four minutes but when cold it could extend to 20 minutes.

To meet this problem, the slipper is preferably filled, immediately before fitting, with an aliquot of polyurethane expanding foam which acts as an adhesive and gap filler when the slipper is fitted to a claw. This foam sets almost immediately and the polymerization is encouraged by wet surfaces which are always present in the hoof area. The polyurethane expanding foam is preferably a single pack resin which is automatically foamed on ejection from an aerosol can.

A specific embodiment of the invention will now be described by way of example and with reference to the accompanying drawings, in which.

Figure 1:
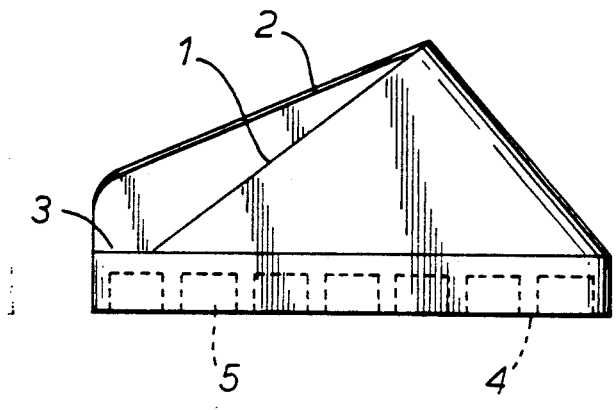
FIG. 1 is a side elevation of the slipper.
Figure 2:
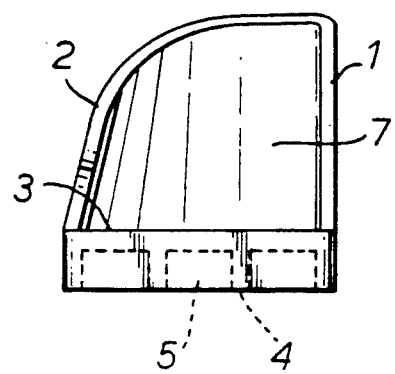
FIG. 2 is an elevation of the claw insert end of the slipper.
Figure 3:
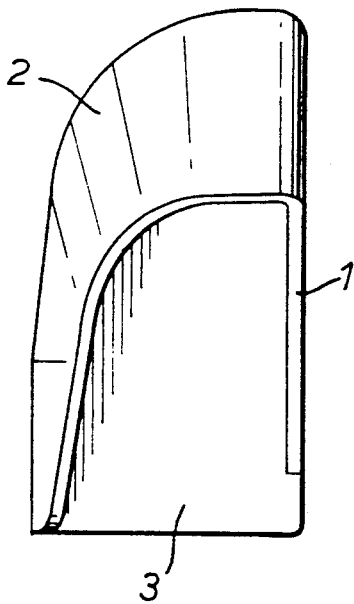
FIG. 3 is a plan view of the slipper.
Figure 4:
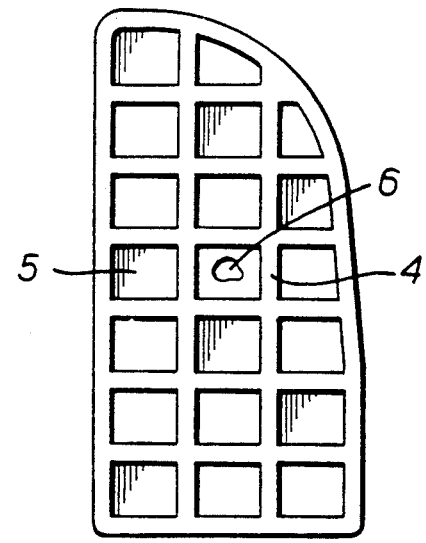
FIG. 4 is an underneath plan view of the slipper.

The illustrated surgical slipper comprises an injection moulded unit, with a left claw configuration, which incorporates an upper consisting of a vertical part 1, which fits between the claws of the foot at the cleft, and a curved part 2 which can be considered to the conventional upper part of a shoe, slipper or clog. This upper configuration surmounts a base or sole 3 which is internally smooth and flat and which is integral with the vertical part 1 and curved part 2. The base or sole 3 has an external or wearing surface 4 which is moulded in a lattice pattern and which effects a cushioning mode on the claw when in use. It has been found that, when in use, the lattice voids 5 tend to consolidate with farm debris or detritus and this soon fills the voids to the surface level so producing a contact area which is mainly compacted debris to ground rather than plastic to ground and this has the effect of rendering the footing anti-slip.

Although the illustrated slipper has a left claw configuration, a right claw version is equally contemplated. This is simply a mirror image of the left claw version, so no specific description is necessary.

In very serious cases of "lame cow" where, a sinus has developed and there is much necrosis and putrefaction it is important to establish and maintain drainage. This can be accomplished in the present embodiment by punching a hole in the lattice ceiling 6.

The preferred fixing adhesive is polyurethane foam which is applied to the inside of the slipper 7 which is inserted over the prepared claw. Polymerisation or setting occurs in a very short time especially if the claw surface is damped with water before insertion into the slipper. If polyurethane foam is exposed when the drain hole is punched it is not hard and can easily be removed to expose the mouth of the sinus.

Persons skilled in the art will realise that various variations on this surgical concept are possible. For example the slipper can be formulated from re-cycled plastic and in this context it has been possible, and extremely beneficial, to re-plasticise the polymer, usually PVC, with antiseptic oil, wood tar and wood creosote all of which are medicaments used in the veterinary field for the treatment of claw and hoof complaints.

I claim:

1. A surgical slipper for cleft footed animals in either a left or right claw configuration, the slipper comprising: a sole and upper which together define a cavity into which one claw of the cleft footed animal is, in use, fitted; an array of intersecting ribs projecting from the underside of the sole to form a plurality of pockets arranged in a lattice-like pattern on the underside of the sole; said ribs projecting from the underside of said sole by an amount sufficient to position the upper side of said sole, when the slipper is in use, a distance away from the ground so that in practice said pockets fill with material that is on the ground, and the sole being sufficiently thin in the bottom of the pockets that a hole can be readily punched through the sole in the bottom of a pocket for drainage purposes.

2. A slipper according to claim 1, wherein the slipper is a single piece made from injection moulded plastic.

3. A slipper according to claim 2, wherein the plastic includes plasticiser in the form of an aliquot of veterinary anti-foot rot compounds.

4. A slipper according to claim 2, wherein the plastic is recycled and the oils for re-plasticising the plastic are selected from a group containing natural antiseptic essential oils, wood tar and wood creosote oil.

5. A slipper according to claim wherein the upper comprises a substantially planar side wall, and a top, front and other side wall which are a continuation of the planar side wall and are convexly curved in both the horizontal and vertical directions.

6. A slipper according to claim 1, wherein the ribs intersect at right angles.

7. A slipper according to claim 1, in combination with an aliquot of polyurethane expanding foam adapted to act as an adhesive and gap filler when the slipper is fitted to a claw.

8. A combination according to claim 7, wherein the polyurethane expanding foam is a single pack resin which is automatically foamed on ejection from an aerosol can.

* * * * *